(12) United States Patent
Tsai

(10) Patent No.: US 9,638,346 B2
(45) Date of Patent: May 2, 2017

(54) VALVE

(71) Applicant: Fu-Chung Tsai, Taichung (TW)

(72) Inventor: Fu-Chung Tsai, Taichung (TW)

( * ) Notice: Subject to any disclaimer, the term of this patent is extended or adjusted under 35 U.S.C. 154(b) by 307 days.

(21) Appl. No.: 14/560,883

(22) Filed: Dec. 4, 2014

(65) Prior Publication Data
US 2016/0161009 A1 Jun. 9, 2016

(51) Int. Cl.
| | |
|---|---|
| *F16K 7/12* | (2006.01) |
| *F16K 31/126* | (2006.01) |
| *F16K 7/17* | (2006.01) |

(52) U.S. Cl.
CPC ........... *F16K 31/126* (2013.01); *F16K 7/126* (2013.01); *F16K 7/17* (2013.01); *F16K 31/1266* (2013.01)

(58) Field of Classification Search
CPC ............. F16K 7/12; F16K 7/17; F16K 31/126
See application file for complete search history.

(56) References Cited

U.S. PATENT DOCUMENTS

| | | | | | |
|---|---|---|---|---|---|
| 2,938,538 | A | * | 5/1960 | Allen | G05D 7/0113 137/504 |
| 3,482,777 | A | * | 12/1969 | Quinn | F16K 31/365 236/12.11 |

FOREIGN PATENT DOCUMENTS

TW        I395895        5/2013

* cited by examiner

*Primary Examiner* — James Sanders
(74) *Attorney, Agent, or Firm* — Muncy, Geissler, Olds & Lowe, P.C.

(57) ABSTRACT

This invention discloses a valve including a body, an upper membrane, a lower membrane and a positioning block. The body has an upper channel, a lower channel, an accommodation space and a valve groove. The accommodation space defines an upper opening and a lower opening for respectively communicating with the upper channel and the lower channel. The valve groove is near the intersection of the lower channel and the accommodation space respectively communicating therewith. The upper and the lower membrane block the upper opening of the accommodation space and the lower opening. The positioning block is disposed between the upper membrane and the lower membrane and is able to push the lower membrane into the valve groove and abut against a sidewall of the valve groove. The valve is able to block the flow of water in the valve when the water flow is needed to be cut off.

6 Claims, 11 Drawing Sheets

VALVE

BACKGROUND OF INVENTION

1. Field of Invention

The present invention relates to a valve, and more particularly relates to a valve mounted in a water purification device.

2. Related Prior Art

The conventional auto shut-off valve is able to control the water flow in a device by water pressure, such as a water filter device which doesn't need an extra electric power device to control the water flow as the conventional solenoid valve does.

Taiwan patent No. 1395895 discloses an integrated valve 7. As shown in FIG. 10, the integrated valve 7 includes a body 71 and a water shut-off device 72. The body 71 has an upper channel 73 and a lower channel 74 inside. The body 71 further has an accommodation space 75 communicating with the upper channel 73 and the lower channel 74 respectively. The water inputted from an inlet 731 of the upper channel 73 is passed through the accommodation space 75 and then output from an outlet 732 of the upper channel. The water shut-off device 72 is mounted in the accommodation space 75. The water shut-off device 72 has a membrane 76 for blocking the communication between the upper channel 73 and the accommodation space 75. When the water in the upper channel 73 reaches the normal water supplying pressure, the water inputted from the inlet 73 of the upper channel 73 pushes and deforms the membrane 76 and enters into the accommodation space 75, and then the water is output from the outlet 732 of the upper channel. In other words, the integrated valve 7 shuts off the connection between the upper channel 73 and the accommodation space 75 by using the membrane 76. Based on the above configuration, the integrated valve 7 prevents the water from flowing through the upper channel 73 into the accommodation space 75.

However, the membrane 76 is just stuck to the connection between the upper channel and a wall surface of the accommodation space 75 formed in the body 71 for blocking the water. The membrane 76 is hard to completely prevent the water from flowing through the upper channel into the accommodation space 75. When the water in the upper channel 73 cannot reach the normal water supplying pressure, the membrane 76 is still unable to prevent the water in the upper channel 73 from entering into the accommodation space 75, thus the waterproof effect of the integrated valve 7 can not be achieved properly.

SUMMARY OF INVENTION

The present invention provides a valve able to effectively control the water flow. More specifically, the valve of the present invention includes a body, an upper membrane, a lower membrane and a positioning block.

The body has an upper channel, a lower channel, an accommodation space and a valve groove. The accommodation space defines an upper opening and a lower opening for respectively communicating with the upper channel and the lower channel. The valve groove is adjacent to the lower channel and the accommodation space and communicated therewith respectively. A sidewall of the valve groove is an inclined surface inclined outwardly from bottom to top thereof.

The upper membrane is disposed in the body and closes the upper opening of the accommodation space, and the upper membrane is a flexible and waterproof material.

The lower membrane is disposed in the body and closes the lower opening of the accommodation space, and the lower membrane is a flexible and waterproof material.

The positioning block is disposed between the upper membrane and the lower membrane and is partially covered by them, wherein corresponding to the valve groove, the positioning block extends a stop block downwardly, so that when the positioning block moves downwardly, the stop block is able to push the lower membrane into the valve groove and abut against the sidewall of the valve groove.

Preferably, the stop block has a positioning sidewall coated by the lower membrane, an angle between the positioning sidewall and a vertical axis being smaller than an angle between the sidewall of the valve groove and the vertical axis. When the stop block pushes the lower membrane against the sidewall of the valve groove, a circular surface is formed at a contact region of the positioning sidewall coated by the lower membrane and the sidewall of the valve groove.

Preferably, the positioning sidewall is a vertical plane.

Alternatively, in another preferred setting mode, the stop block has an inclined positioning sidewall covered by the lower membrane, and an angle between the positioning sidewall and the vertical axis is equal to an angle between the sidewall of the valve groove and the vertical axis. When the stop block pushes the lower membrane against the sidewall of the valve groove, the positioning sidewall covered by the lower membrane contacts the sidewall of the valve groove.

Preferably, the valve further includes a toothed-shape ring wall located on top of the valve groove, the toothed-shape ring wall having a plurality of pores arranged interlaced.

Preferably, the valve further includes a convex column, when the stop block pushes the lower membrane into the valve groove to a minimum position and abutting against a sidewall of the valve cavity, the membrane is just able to contact the convex column.

Preferably, the lower channel consists of a first lower channel and a second lower channel, the valve groove is located between the first lower channel and the second channel, the first lower channel communicates with the second lower channel through the valve groove.

Preferably, the valve further includes a hole formed in the sidewall of the valve groove and the hole communicates with the first lower channel.

Preferably, the valve further includes a lower groove located on top of an opening of the valve groove, the valve groove communicates with the second lower channel through the lower groove.

Based on the above configurations, the valve of the present invention is able to shut off the water flow when the flow of water in the valve is needed to be blocked, thus the water flow can be effectively controlled.

Other features, objects, aspects and advantages will be identified and described in detail below.

BRIEF DESCRIPTION OF DRAWINGS

The invention is illustrated by the accompanying drawings in which corresponding parts are identified by the same numerals and in which.

DETAILED DESCRIPTION OF PREFERRED EMBODIMENT

FIGS. 1-9 show the preferred embodiments of the invention.

Figure 1:
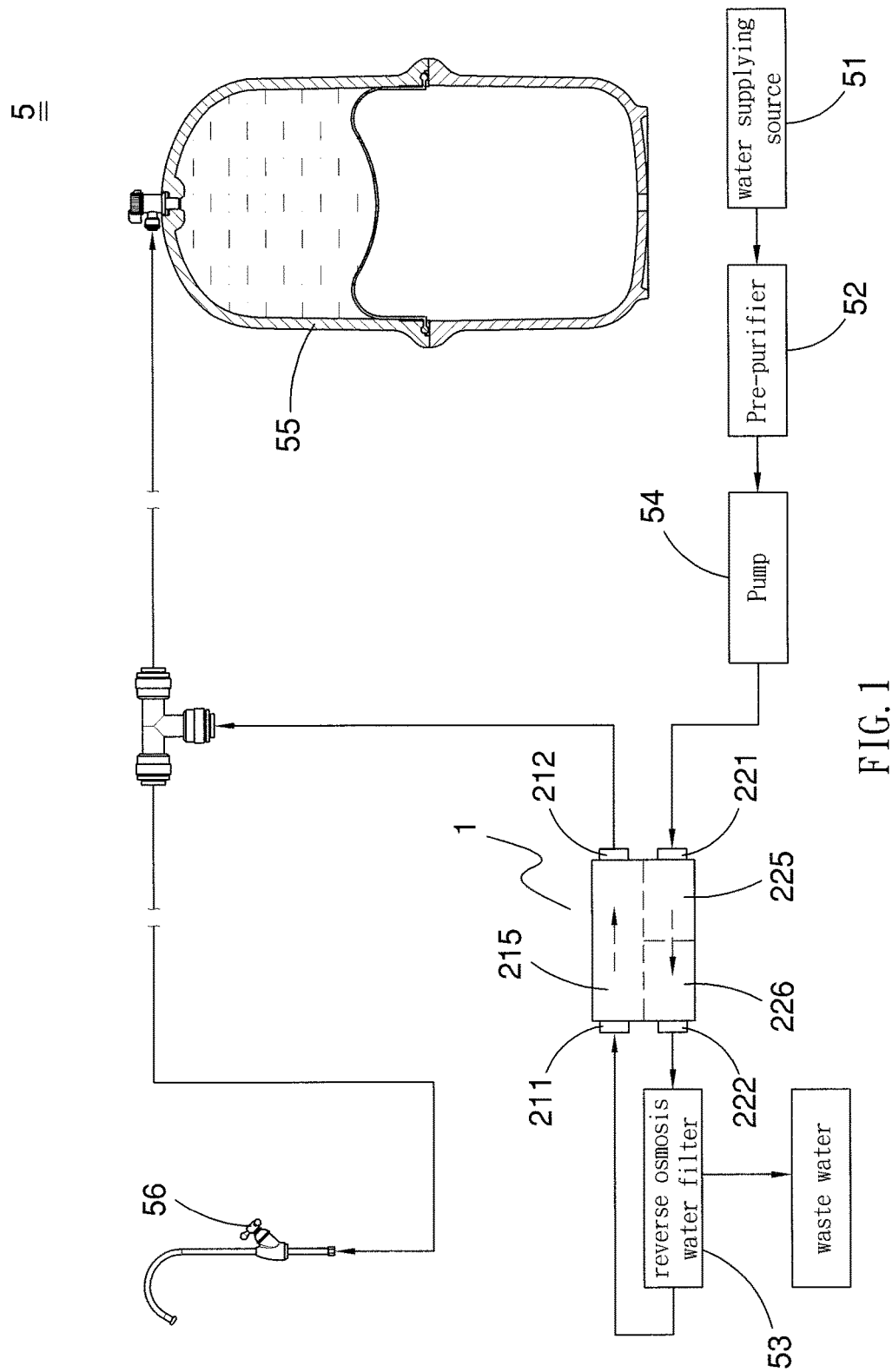
FIG. 1 is a schematic diagram showing a water treatment system of one preferred embodiment of the present invention.

FIG. 1 is a cross-sectional schematic view showing the actual operation situation that the valve 1 of the present invention is mounted in a water treatment system 5. The water treatment system 5 is used for converting the raw water into the drinkable pure water. The water treatment system 5 includes a valve 1, a water supply source 51, a pre-purifier 52, a reverse osmosis water filter 53, a pump 54, a water storage tank 55 and a water intake device 56. The valve 1 has an inlet 221, an outlet 222, an inlet 211 and an outlet 212. The valve defines a first lower channel 225, a second lower channel 226 and an upper channel 215. Wherein the first lower channel 225 is not connected to the upper channel 215, and the second lower channel 226 is not connected to the upper channel 215 either. Moreover, the pressure difference between the water pressure of the upper channel 215 and the water pressure of the first lower channel 225, the second lower channel 226 can be used to connect or isolate the first lower channel 225 and the second lower channel 226. The water supply source 51 can be a water outlet or a pumping motor, and the water supply source is not limited to the above example.

The water supply source 51 is first connected with the water pre-purifier 52 for preliminarily filtering the water supplied by the water supply source 51 so as to filter out a lot of impurities therein, and effectively protect the reverse osmosis water filter 53, a pump 54, a water storage tank 55 and a water intake device 56 in the back-end and the pipelines thereamong. The pre-purifier 52 includes a plurality of serial filter cartridges (not shown in the figure). The water filtered by the pre-purifier 52 passes through the pump 54 into the inlet 221 of the valve 1. The water flow passes through the first lower channel 225 and the second lower channel 226 and then reaches the outlet 222. The outlet 222 is connected to the reverse osmosis water filter 53, so that the water can be filtered again by a reverse osmosis membrane (not shown in the figure) of the reverse osmosis water filter 53 and the raw water containing a high concentration of impurities is drained as the waste water. The reverse osmosis water filter 53 is connected to the inlet 211 of the valve 1. The pure water filtered by the reverse osmosis water filter 53 flows through the inlet 211, the upper channel 215 and out from the outlet 212 to the storage tank 55 finally. The storage tank 55 is connected to the water intake device 56.

The water intake device 56 is a water dispenser, which can be replaced with other types of the water intake device.

Through the valve 1, the raw water and the pure water flowing in the water treatment system 5 can not be mixed together. The valve 1 is able to control whether the water flows or not. When the water in the water storage tank 55 is filled to a certain extent, the water pressure difference is sufficient to isolate the communication between the first lower channel 225 and the second lower channel 226. In this case, the water in the first lower channel 225 of the valve 1 will no longer flow into the second lower channel 226, so that the pure water stops flowing to the water storage tank 55. When a large amount of pure water in the water storage tank 5 is removed by the users, the water level in the water storage tank 5 drops. At this moment, the water pressure difference is insufficient to isolate the first lower channel 225 from the second lower channel 226. Thus, the water in the first lower channel 225 of the valve 1 flows into the second lower channel 226 again, and then the pure water flows into the water storage tank 55. The specific structure and manner of how the valve 1 effectively controls the water flow are detailed in the following description.

Figure 2:
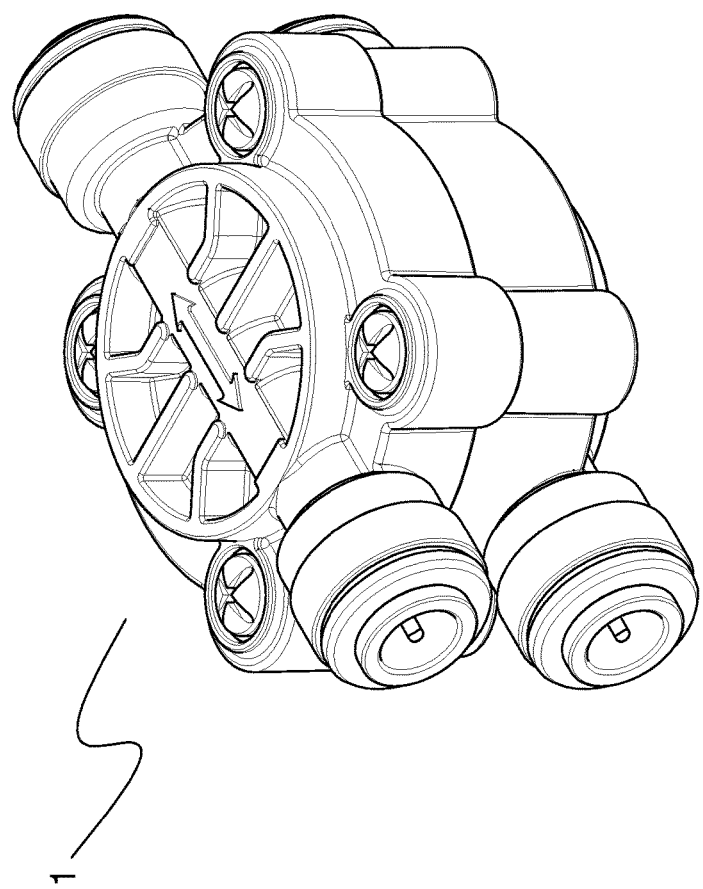
FIG. 2 is a schematic diagram showing the appearance of one embodiment of the present invention.
Figure 3:
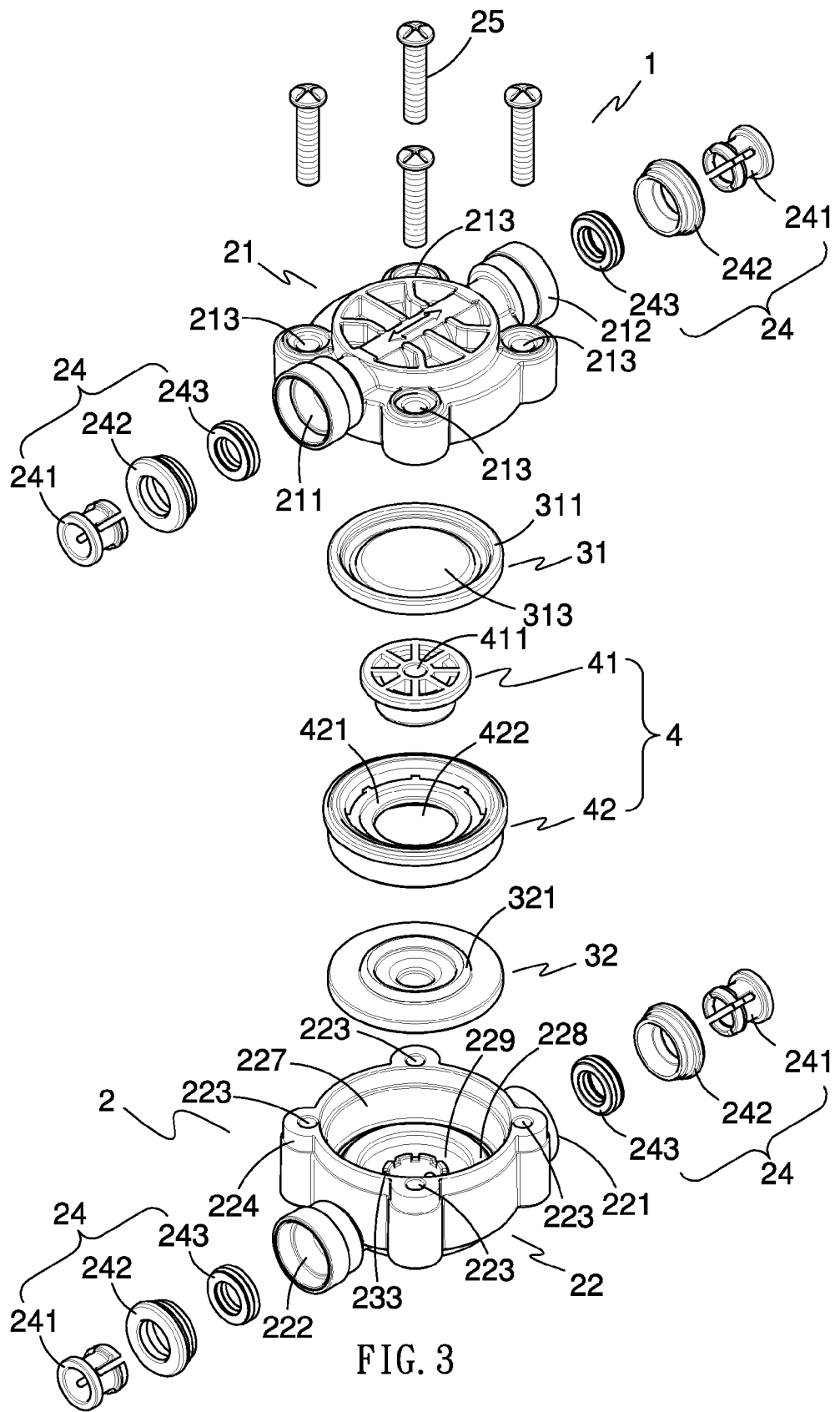
FIG. 3 is an exploded schematic diagram showing the preferred embodiment of the present invention.
Figure 4:
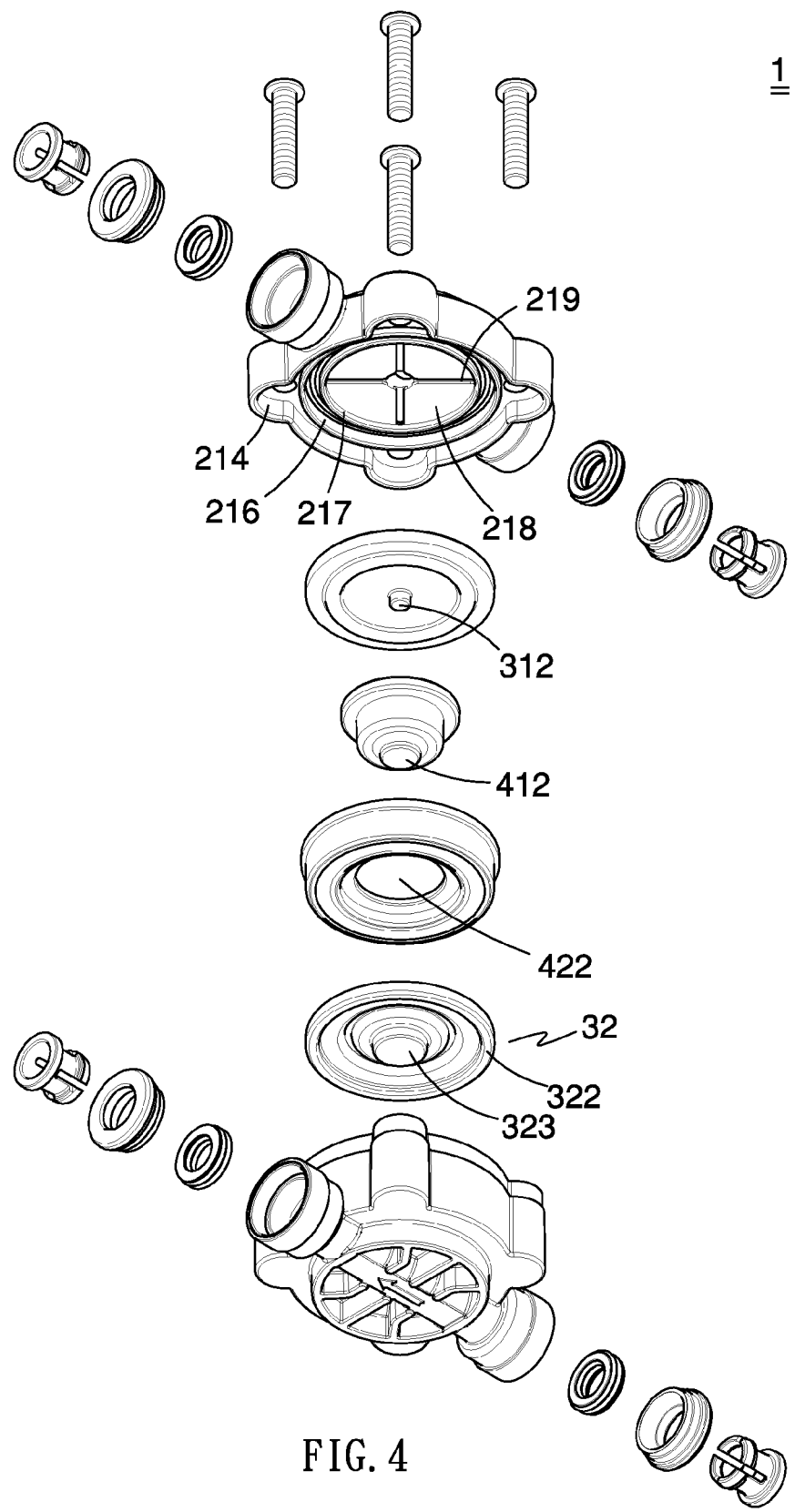
FIG. 4 is another perspective exploded schematic diagram showing the preferred embodiment of the present invention.
Figure 5:
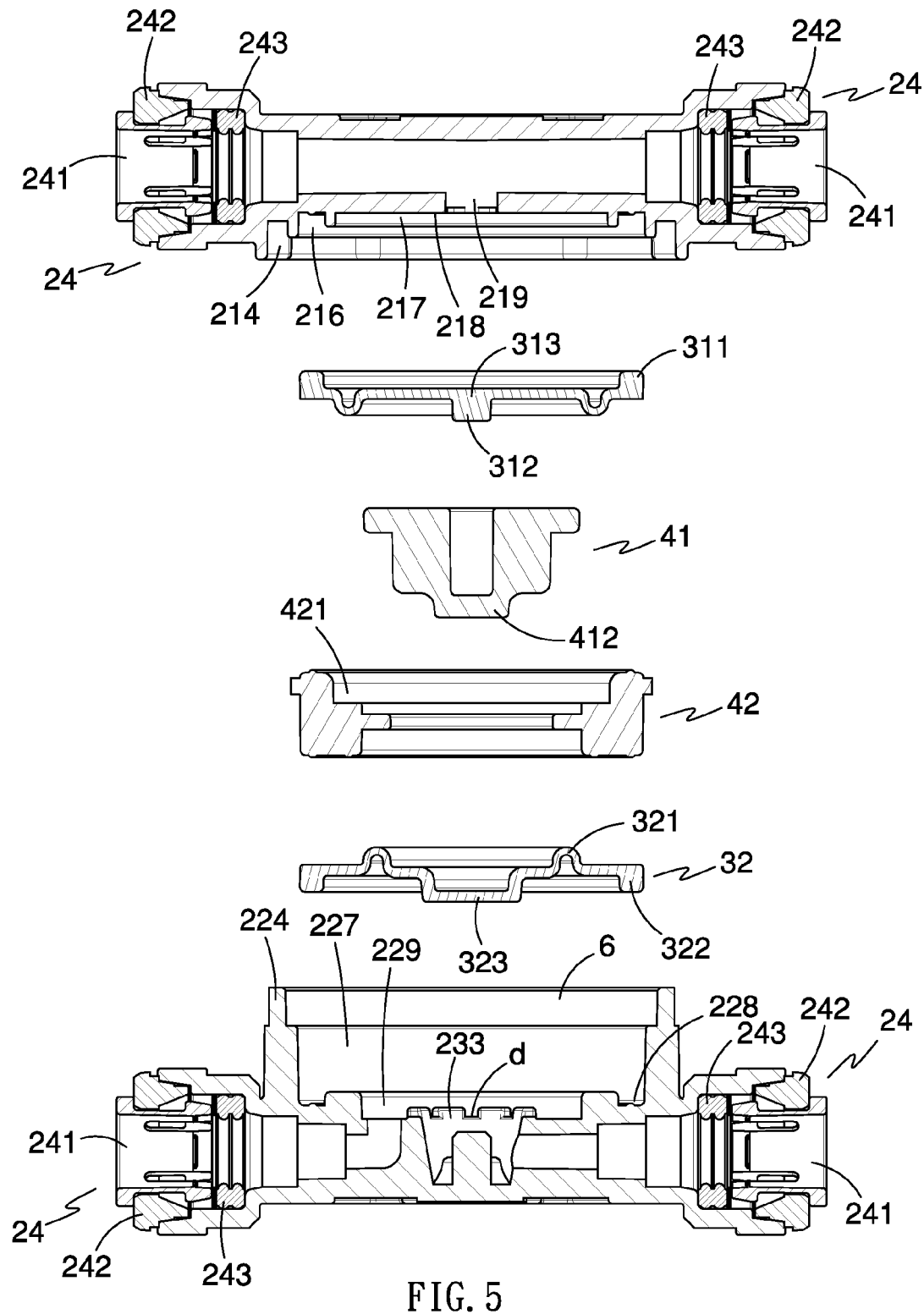
FIG. 5 is a cross-sectional schematic diagram showing the preferred embodiment of the present invention.

FIG. 2 shows the overall appearance of the valve of the present invention. FIG. 3 and FIG. 4 are the exploded schematic diagrams with different perspective of the valve of the present invention. FIG. 5 is the cross-sectional schematic view of the valve of the present invention. In FIG. 3, the valve 1 includes a body 2, an upper membrane 31, a lower membrane 32 and a positioning block 4. The body 2 consists of an upper portion 21, a lower portion 22, four clamp assemblies 24 and four bolt members 25. The upper portion 21 includes an inlet 211, an outlet 212, four bolt holes 213, an engaging groove 214 (as shown in FIG. 4). The lower portion 22 includes an inlet 221, an outlet 222, four bolt holes 223, an engaging block 224 and an accommodation groove 227. The engaging groove 214 of the upper portion 21 tightly engages with the engaging block 224 of the lower portion 22 (also shown in FIG. 5), so as not to leave a gap between the engaging groove 214 and the engaging block 224. Those bolt holes 213 of the upper portion 21 overlap those bolt holes 223 of the lower body 22 respectively. Those bolt members 25 passes through those bolt holes 213, 223 of those upper and lower portions 21, 22 and tightly combine those upper portions 21 and lower portions 22 together.

Those clamp assemblies 24 are respectively installed on the inlet 211, outlet 212 of the upper portion 21 and the inlet 221, the outlet 222 of the lower portion 22. When a pipe (not shown in the figure) is inserted into the inlets 211, 221 and the outlets 212, 222, the pipe also passes through those clamp assemblies 24 at the same time. Then, those clamp assemblies 24 fix the pipe. The pipe is therefore not able to be pulled out. Referring to FIG. 5, each of the clamp assemblies 24 includes a clamp 241, a ring buckle 242 and a seal ring 243. The seal ring 243 is used to prevent water from leaking out of the inlets 211, 221 and outlets 212, 222 of the valve 1. The clamp 241 is used to fix the pipes. The ring buckle 242 is used to prevent the pipe from being pulled out of the clamp 241. The inner diameter of each ring buckle 242 is slightly reduced from inside to outside thereof (i.e. the inlets 211, 221 or the outlets 212, 222). When the pipe is pulled outwardly from the clamp 241, the ring buckle 242 will simultaneously force the clamp buckle 241 to tighten inwardly and tightly clench the pipe. The way to remove the pipe from the clamp 241 is to press and hold the ring buckle 242 first so that the ring buckle 241 is impossible to force the clamp 241 to contract inwardly.

Referring to FIG. 3-5 at the same time, in FIG. 3, the accommodation groove 227 of the lower portion 22 and the upper portion 21 defines an accommodation space 6 (FIG. 5). The upper membrane 31, the lower membrane 32 and the positioning block 4 are mounted in the accommodation space 6, and the positioning block 4 is partially covered by the upper membrane 31 and the lower membrane 32. The upper membrane 31 is a flexible and waterproof material, wherein the rubber material is preferable. The upper membrane 31 has an upper protruding portion 311, a lower protruding portion 312 (FIG. 4), and an upper contacting surface 313. The upper portion 21 further includes an upper positioning groove 216 (FIG. 4), an upper groove 217 (FIG. 4), a contacting surface 218 (FIG. 4) and a groove 219 (FIG. 4). The protruding portion 311 can be embedded in the upper positioning groove 216 so as to make the upper membrane 31 to be fixed onto the body 21. Most of the membrane 31 is mounted in the upper groove 217. The upper contacting surface 313 of the upper membrane 31 is able to contact with the contacting surface 218 of the upper body 21. When the upper contacting surface 313 contacts with the contacting surface 218, the groove 219 forms a gap therebetween, the gap is able to prevent the contact between the upper contacting surface 313 and the contacting surface 218 from being too tight to be separated.

The positioning block 4 includes a first positioning portion 41 and a second positioning portion 42. The first positioning portion 41 is mounted in a receiving groove 421 (FIG. 5) of the second positioning portion 42 and penetrates through a perforation 422 of the second positioning portion 42. The first positioning portion 41 has an interlocking hole 411 on the surface thereof The lower projecting portion 312 is embedded into the first positioning portion 41 through the interlocking hole 411 and the first positioning portion 41 is partially covered by the upper membrane 31. The first positioning portion 41 further extends a stop block 412 downwardly (FIG. 4).

Referring to FIG. 3-5 at the same time again, in FIG. 3, the lower membrane 32 is a flexible and waterproof material, wherein rubber material is preferable. The lower membrane 32 has an upper protruding portion 321, a lower protruding portion 322 (FIG. 4), and a connection portion 323 (FIG. 4). The upper protruding portion 321 is embedded in the perforation 422 of the second positioning portion 42, and the stop block 412 is tightly coated by the connection portion 323. The lower membrane 32 simultaneously contacts the second positioning portion 42. The accommodation groove 227 further includes a lower positioning groove 228 and a lower groove 229 (FIG. 4). The lower protruding portion 322 of the lower membrane 32 is embedded in the lower positioning groove 228. The connection portion 323 tightly covering the stop block 412 is mounted in the lower groove 229.

Figure 6:
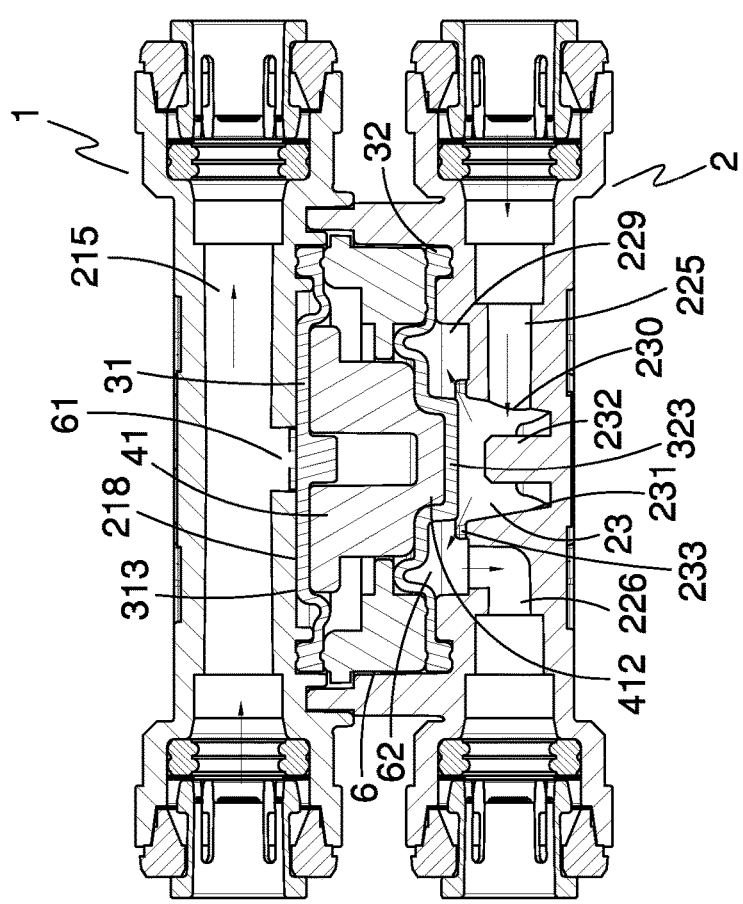
FIGS. 6-8 are schematic diagrams showing movements of the preferred embodiment of the present invention.

FIG. 6 shows the cross-sectional schematic view of the assembled valve of the present invention, which is operated in the water treatment system 5. The accommodation space 6 has an upper opening 61 and a lower opening 62. The accommodation space 6 respectively communicates with the first lower channel 225, the second lower channel 226 and the upper channel 215 via the connection of the upper channel and the lower channel. The body 2 near the connection among the first lower channel 225, the second lower channel 226 and the accommodation space 6 further includes a valve groove 23, and the lower groove 229 is located on top of the opening of the valve groove 23. The valve groove 23 respectively communicates with the first lower channel 225, the lower channel 226 and the accommodation space 6. The valve groove 23 further includes a sidewall 231, a toothed ring wall surface 233 located on the top of the valve groove 23, a convex column 232 extended upwardly from the bottom of the valve groove 23, and a hole 230 formed in the sidewall 231 of the valve groove 23 and communicated with the first lower channel 225. The sidewall 231 of the valve groove 23 is an inclined surface inclined outwardly from bottom to top thereof, i.e. the inner diameter of the upper end is larger than the inner diameter of the lower end.

FIG. 6 also shows the situation when the water supply source 51 starts delivering water to the valve 1. At this moment, the volume of water flowing into the water storage tank 55 is still small (not shown in the figure). The internal pressure of the water storage tank 55 is related to the internal water storage capacity thereof That is, when the water stored in the water storage tank 55 is less, the internal pressure therein is small, and the water pressure in the upper channel 215 in communication with the water storage tank 55 is as small as the water pressure in the water storage tank 55, and the water pressure in the first lower channel 225 and a second lower channel 226 is greater than the water pressure in the upper channel 215. Therefore, the upper membrane 31, the lower membrane 32 and the first positioning portion 41 will be uplifted by an upward force of the water pressure of the first lower channel 225 and the second lower channel 226. The upper contacting surface 313 of the upper membrane 31 closely contacts the contacting surface 218.

In addition, the upper membrane 31 blocks the upper opening 61 of the accommodation space 6 so that the upper channel 215 can not be communicated with the accommodation space 6. The lower membrane 32 blocks the lower opening 62 of the accommodation space 6 so that the first lower channel 225 and the second lower channel 226 can not be communicated with the accommodation space 6. Via the above configuration, the water flow in the first lower channel 225, the second lower channel 226 and the upper channel 215 are respectively blocked by the upper membrane 31 and the lower membrane 32. In other words, the flowing water in the valve 1 will not penetrate into the accommodation space 6, and the unfiltered raw water in the first lower channel 225 and the second lower channel 226 will not be mixed up with the filtered water of the upper channel 215. The connection portion 323 of the lower membrane 32 tightly covering the stop block 412 is moved away from the valve groove 23 by the water pressure in the first lower channel 225 and the second lower channel 226. At this moment, the water in the first lower channel 225 can pass through the hole 230 of the valve groove 23, the valve groove 23 and the lower groove 229 into the second lower channel 226.

Figure 7:
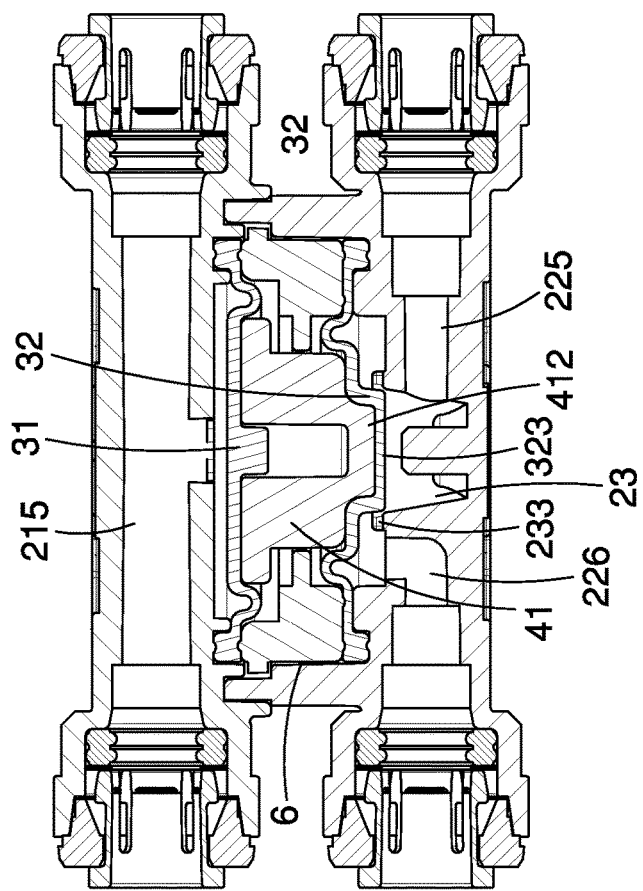

FIG. 7 shows the situation after the water level moves up in the water storage tank 55 (not shown in the figure). At this moment, both the water pressure in the water storage tank 55 and the water pressure of the upper channel 215 communicating with the water storage tank 55 will therefore rise. When the water pressure in the upper channel 215 is larger than the water pressure in the first lower channel 225 and the second lower channel 226, the upper membrane 31, the lower membrane 32 and the first positioning portion 41 will be moved downwardly by the water pressure in the upper channel 215. In this case, the connection portion 323 of the lower membrane 32 tightly covering the stop block 412 contacts the toothed ring wall 233 on top of the valve groove 23, and simultaneously blocks the opening of the valve groove 23, which achieves the effect that the water flowing from the first lower channel 225 into the valve groove 23 cannot pass through the lower groove 229 into the second lower channel 226. The toothed ring wall 233 has a plurality of gaps d (as shown in FIG. 5), when the connection portion 323 is forced into the opening of the valve groove 23 by the water pressure in the upper channel 215, those gaps d can release the water hammer effect in the valve groove 23.

Figure 8:
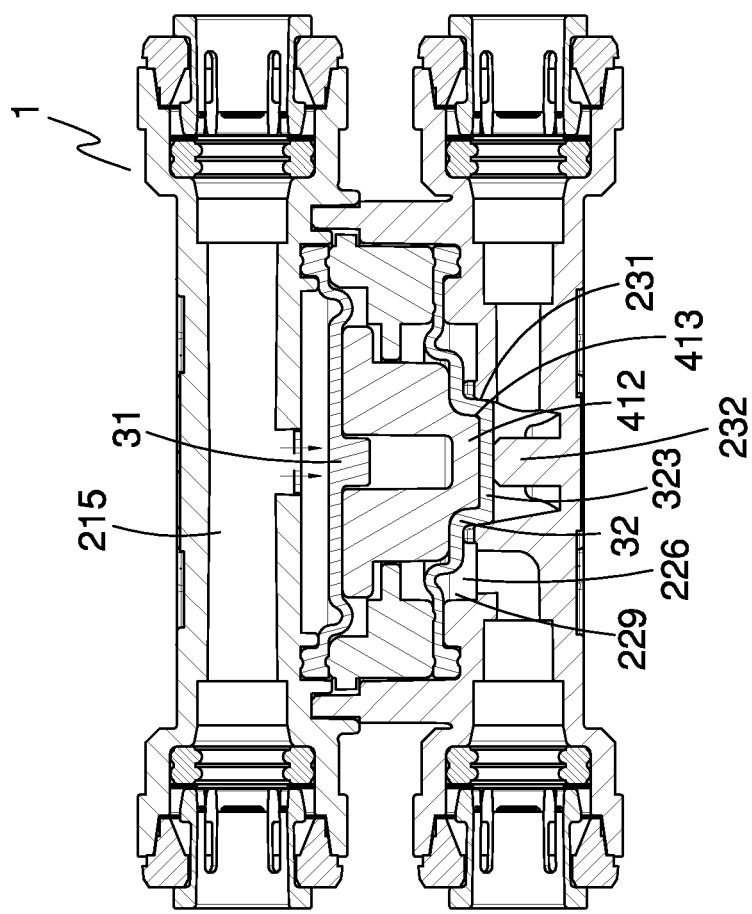

Referring to FIG. 8, when the water pressure in the upper channel 215 is greater than the water pressure in the first lower channel 225 and the second lower channel 226, the upper membrane 31, the lower membrane 32 and the positioning block 4 are forced to move further downward by the water pressure in the upper channel 215. The connection portion 323 of the lower membrane 32 tightly covering the stop block 412 enters the valve groove 23 and abuts against the sidewall 231 of the valve groove 23. The connection portion 323 slightly enters the valve groove 23 and soon reaches a minimum limit position. At the minimum limit position, the connection portion 323 contacts the convex column 232 and stops moving deeper. The convex column 232 avoids the connection portion 323 moving into the valve groove 23 too deep to separate with the valve groove 23.

Figure 8A:
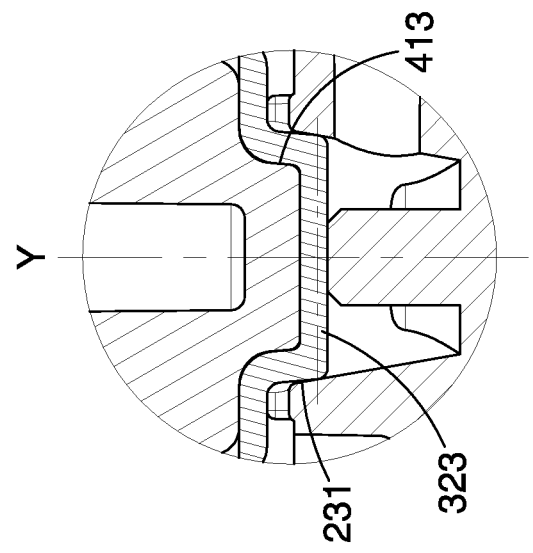
FIG. 8A is a partially enlarged diagram showing the preferred embodiment of the present invention.

The stop block 412 further has a positioning sidewall 413, the positioning sidewall 413 being able to be inclined outwardly from bottom to top thereof, and the slope of the inclined surface being less than the slope of the sidewall 231. The positioning sidewall 413 can also be a vertical circular plane. Refer to the partial enlarged view of FIG. 8A. In other words, the angle between the sidewall 231 of the valve groove 23 and the vertical axis Y is greater than the angle between the positioning sidewall 413 and the vertical axis Y. The sidewall 413 is also covered by the connection portion 323 of the lower membrane 32, therefore the outer side of the connection portion 323 is an inclined surface that has the same slope as the positioning sidewall 413.

Figure 8B:
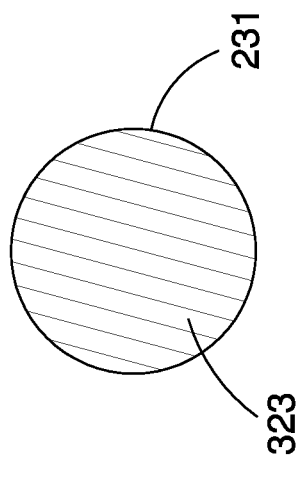
FIG. 8B is a partially cross-sectional diagram showing the preferred embodiment of the present invention.

The positioning sidewall 413 is used to tightly contact the sidewall 231 when the connection portion 323 enters the valve groove 23. Thus, the passage between the first lower channel 225 and the second lower channel 226 is therefore blocked. An annular sealing surface is formed at the contact region of the connection portion 323 and the sidewall 231. FIG. 8B shows the sectional view of the annular sealing surface. In other words, as shown in the side section of FIG. 8, the positioning sidewall 413 covered by the connection portion 323 contacts with the sidewall 231. Based on above configuration, the water passage is blocked, the contact area between the engaging portion 323 of the membrane 32 and the sidewall 231 is small, and the friction therebetween is also small.

When the first lower channel 225 is once again greater than the water pressure in the upper channel 215, the connection portion 323 of the lower membrane 32 tightly covering the stop block 412 can be easily moved away from the valve groove 23, so that the water from the first lower channel 225 to the valve groove 23 can be delivered through the lower groove 229 and enters the second lower channel 226.

Figure 9:
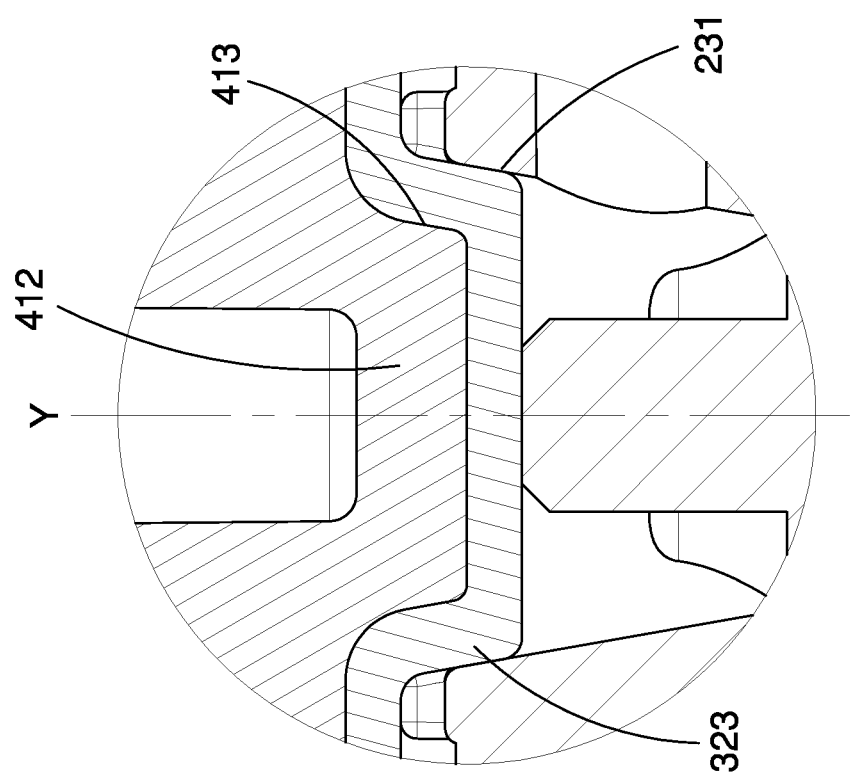
FIG. 9 is a partially enlarged diagram showing another preferred embodiment of the present invention.
Figure 10:
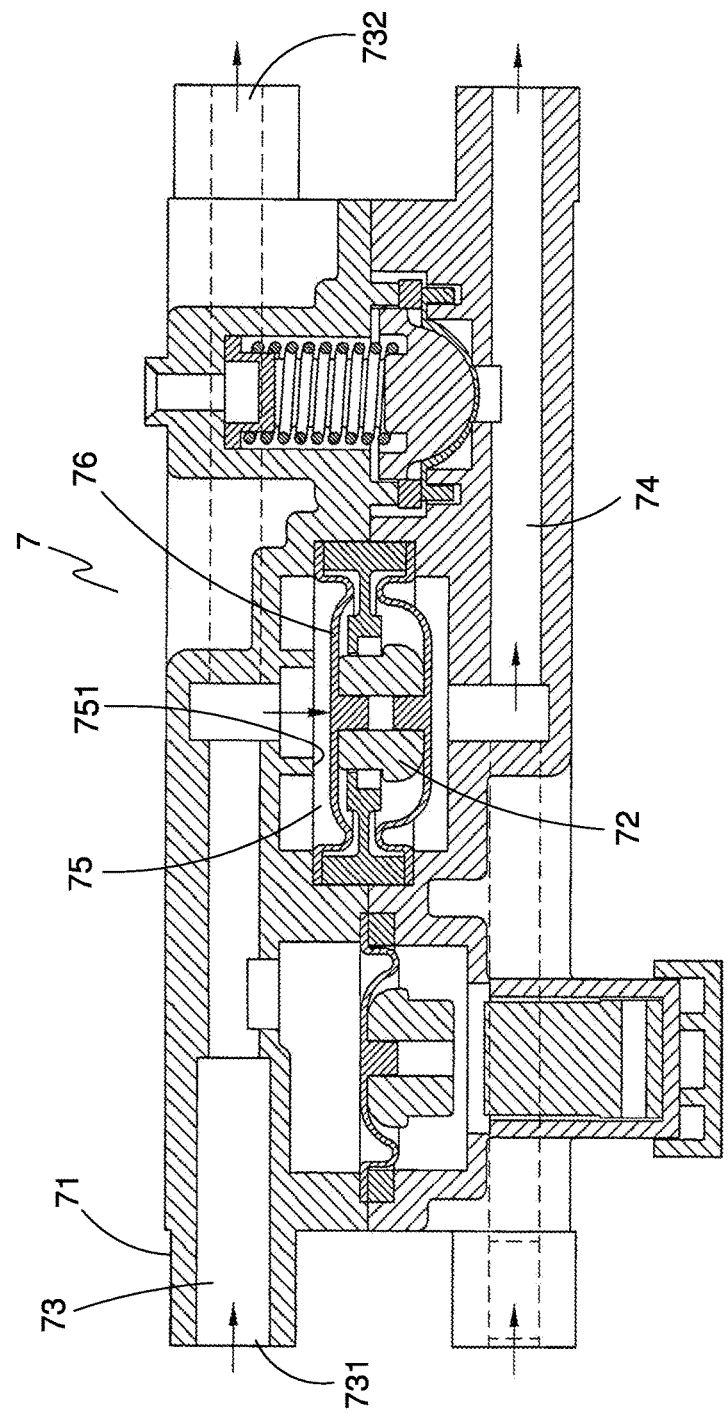
FIG. 10 is a cross-sectional schematic diagram showing a conventional integrated valve.

FIG. 9 shows another preferred embodiment of the present invention, which is substantially the same configuration as the previous embodiment of the present embodiment. The only difference is that an angle between the positioning sidewall 413 of the valve 1 and the vertical axis Y is equal to an angle between the sidewall 231 of the valve groove 23 and the vertical axis Y. Thus, the connection portion 323 tightly covering the stop block 412 will tightly contact the sidewall 231, which allows the connection portion 323 of the lower membrane 32 to have a better effect of blocking the water flow.

Via the above configuration, the valve of the present invention is able to cut off the water flow when the flow of water in the valve is needed to be blocked, therefore the water flow can be effectively controlled.

It will be appreciated that although a particular embodiment of the invention has been shown and described, modifications may be made. It is intended in the claims to cover such modifications which come within the spirit and scope of the invention.

The invention claimed is:

1. A valve, comprising:
   a body having an upper channel, a lower channel, an accommodation space and a valve groove; the accommodation space defining an upper opening and a lower opening for respectively communicating with the upper channel and the lower channel; the valve groove being adjacent to the lower channel and the accommodation space and communicated therewith respectively, and a sidewall of the valve groove being an inclined surface inclined outwardly from bottom to top thereof;
   an upper membrane disposed in the body and blocking the upper opening of the accommodation space, the upper membrane being a flexible and waterproof material;
   a lower membrane disposed in the body and blocking the lower opening of the accommodation space, the lower membrane being a flexible and waterproof material; and
   a positioning block disposed between the upper membrane and the lower membrane and partially covered by them, wherein corresponding to the valve groove, the positioning block extends a stop block downwardly, so that when the positioning block moves downwardly, the stop block is able to push the lower membrane into the valve groove and abut against the sidewall of the valve groove;
   wherein the lower channel consists of a first lower channel and a second lower channel, the valve groove located between the first lower channel and the second channel, the first lower channel communicated with the second lower channel through the valve groove, a hole formed in the sidewall of the valve groove, the hole communicated with the first lower channel, and a lower groove located on top of an opening of the valve groove, the valve groove communicated with the second lower channel via the lower groove.

2. The valve as recited in claim 1, wherein the stop block has a positioning sidewall covered by the lower membrane, an angle between the positioning sidewall and a vertical axis being smaller than an angle between the sidewall of the valve groove and the vertical axis, when the stop block pushes the lower membrane against the sidewall of the valve groove, a circular surface is formed at a contact region of the positioning sidewall covered by the lower membrane and the sidewall of the valve groove.

3. The valve as recited in claim 2, wherein the positioning sidewall is a vertical plane.

4. The valve as recited in claim 1, wherein the stop block has an inclined positioning sidewall covered by the lower membrane, and an angle between the positioning sidewall and the vertical axis is equal to an angle between the sidewall of the valve groove and the vertical axis, when the stop block pushes the lower membrane against the sidewall of the valve groove, the positioning sidewall covered by the lower membrane contacts the sidewall of the valve groove.

5. The valve as recited in claim 1, further comprising a toothed ring wall located on top of the valve groove, the toothed ring wall having a plurality of pores arranged interlaced.

6. The valve as recited in claim 1, further comprising a convex column, when the stop block pushes the lower membrane into the valve groove to a minimum position and abuts against a sidewall of the valve groove, the membrane is just able to contact the convex column.

* * * * *